United States Patent
Phillips

(12)
(10) Patent No.: US 6,171,224 B1
(45) Date of Patent: Jan. 9, 2001

(54) FINISHING OF TUNGSTEN CARBIDE SURFACES

(75) Inventor: Frank H. Phillips, Roberts, WI (US)

(73) Assignee: Imation Corp., Oakdale, MN (US)

(*) Notice: Under 35 U.S.C. 154(b), the term of this patent shall be extended for 0 days.

(21) Appl. No.: 09/433,084

(22) Filed: Nov. 3, 1999

Related U.S. Application Data

(62) Division of application No. 08/929,833, filed on Sep. 15, 1997, now Pat. No. 6,004,189.

(51) Int. Cl.[7] .............................. F16C 13/00; B32B 15/04
(52) U.S. Cl. ........................ 492/59; 428/627; 428/34.4; 428/698; 428/612; 428/697; 428/472; 501/87
(58) Field of Search ................................... 428/627, 34.4, 428/698, 472, 36.9, 612, 697; 501/93, 87; 492/59

(56) References Cited

U.S. PATENT DOCUMENTS

| | | |
|---|---|---|
| 3,203,139 | 8/1965 | Giese . |
| 3,836,341 * | 9/1974 | Saltzman et al. .................... 29/191.6 |
| 4,826,734 | 5/1989 | Jackson et al. . |
| 4,841,683 | 6/1989 | Williams . |
| 4,842,633 * | 6/1989 | Kuribayashi et al. ................... 65/44 |
| 4,953,385 | 9/1990 | Aoki et al. . |
| 4,963,183 * | 10/1990 | Hong ...................................... 75/241 |
| 5,075,129 | 12/1991 | Jackson et al. . |
| 5,141,571 * | 8/1992 | DuBois ................................. 148/27 |
| 5,148,639 | 9/1992 | Sakai et al. . |
| 5,223,332 | 6/1993 | Quets . |
| 5,269,683 | 12/1993 | Hickok et al. . |
| 5,480,695 | 1/1996 | Tenhover et al. . |
| 5,485,890 * | 1/1996 | Cawthorne et al. ................. 175/228 |
| 5,535,838 | 7/1996 | Keshavan et al. . |
| 5,616,426 | 4/1997 | Tenhover et al. . |
| 6,004,189 * | 12/1999 | Phillips ................................. 451/49 |

FOREIGN PATENT DOCUMENTS

| | | |
|---|---|---|
| 359472 | 4/1930 | (GB) . |
| 434786 | 12/1933 | (GB) . |
| 407290186A * | 11/1995 | (JP) . |

OTHER PUBLICATIONS

"Calender Rolls—Thermal spray coatings reduce wear and corrosion on calender rolls," Phillips and Knapp, *Tappi Journal*, vol. 78, No. 10, Oct. 1995, pp. 196–205.

Case History of GEM Microfinisher, Grinding Equipment & Machinery Co., Inc., Youngstown, OH, dated prior to Sep. 15, 1997.

Paper entitled "What is a Microfinisher?" from Grinding Equipment & Machinery Co., Inc., Youngstown, OH, dated prior to Sep. 15, 1997.

* cited by examiner

*Primary Examiner*—Deborah Jones
*Assistant Examiner*—Stephen Stein
(74) *Attorney, Agent, or Firm*—Eric D. Levinson

(57) ABSTRACT

A tungsten carbide surface is finished to an RMS surface roughness of about 25 nm (1.0 microinch) or less by abrasion using diamond grit particles. The tungsten carbide surface is abraded by a sequence of grit particle-containing abrasive members, such as abrasive films, pastes, or slurries, at least one of the members having an average grit particle diameter of about 2 μm or less. The finish is enhanced by oscillating the abrasive member back and forth over the tungsten carbide surface. A different speed is used for at least two consecutive films in the series, thereby generating scratches at different angles which can be distinguished. A superfinish, corresponding to a lack of visible scratches at 100× magnification, can be obtained by abrading the tungsten carbide surface with a diamond slurry or paste having grit particles with an average diameter of about 1 μm or less.

10 Claims, 2 Drawing Sheets

FINISHING OF TUNGSTEN CARBIDE SURFACES

This is a divisional of Application Ser. No. 08/929,833 filed on Sep. 15, 1997, now U.S. Pat. No. 6,004,189.

FIELD OF THE INVENTION

The invention relates in general to a method for finishing tungsten carbide surfaces and to articles having a finished tungsten carbide surface. In particular, the invention is directed to a method of finishing tungsten carbide surfaces by contacting the tungsten carbide surface with a series of increasingly finer abrasive members.

BACKGROUND OF THE INVENTION

Tungsten carbide compositions have been useful for providing hard, durable surfaces. One particularly important application for such surfaces is tools, such as calender rolls for use in manufacturing. However, many tools require surfaces with very smooth finishes. In particular, calender rolls used to apply magnetic coatings on tape have very exacting smoothness requirements, for example, an RMS (root-mean-square) surface roughness of about 25 nm (about 1 microinch) or less. The RMS surface roughness is a measurement of the typical surface structure found on the object. Surface deformities in the calender roll, such as pits and peaks (e.g., particles sticking out of the surface) will be transferred to the magnetic coating during the coating process. However, the surface of the magnetic tape, after the magnetic coating has been applied, should be very smooth to reduce noise caused by the surface deformities.

Other manufacturing processes also require calender rolls that, although they often do not need the precision of magnetic tape rolls, should have a relatively smooth surface. Furthermore, smooth surfaces made using a hard, durable material may be useful in other applications, such as optics.

Currently, calender rolls in the magnetic film industry have chrome coatings, which also have relatively smooth surfaces. However, these coatings are relatively soft and wear out rapidly. Furthermore, chrome surfaces also tend to have cracks that give the surface the appearance, under a microscope, of a dry lake bed. These cracks may be transferred to the magnetic tape. Moreover, chrome has been recognized to be environmentally hazardous and is now regulated. Thus, there is a need for an alternative.

One potential substitute for chrome is tungsten carbide, which forms a harder and more durable surface coating for calender rolls and other tools. Suitable tungsten carbide coatings often include up to 40 wt. % of other metals, such as chromium, cobalt, and nickel. The addition of these metals often gives the tungsten carbide coating improved properties, such as durability, hardness, and enhanced bond strength with the substrate.

However, these tungsten carbide coatings are often sensitive to current finishing methods and there has been difficulty achieving the necessary surface roughness requirements; in particular, when a relatively uniform profile must be obtained. One danger when trying to finish tungsten carbide is overworking (e.g., using many passes to finish the surface). Overworking a tungsten carbide surface typically increases the porosity of the surface as portions of the surface are removed. This results in an increased RMS surface roughness and possibly introduction of pits into the surface. A method is needed for finishing tungsten carbide surfaces to obtain the desired smoothness without overworking the surface and defeating the desired goal.

SUMMARY OF THE INVENTION

One embodiment of the invention is a method for finishing a tungsten carbide surface on a cylinder which includes contacting the tungsten carbide surface with a first abrasive member while the cylinder is rotating. The first abrasive member is coated with grit particles and is positioned between a support and the tungsten carbide surface. The support and the abrasive member oscillate back and forth across the tungsten carbide surface at a first rate. This oscillation forms a first pattern of markings on the tungsten carbide surface at a first angle relative to the axis of rotation. Subsequently, the tungsten carbide surface is contacted with a second abrasive member which has grit particles that are finer than the grit particles of the first abrasive member. The second abrasive member is positioned between a support and the tungsten carbide surface. The support and the second abrasive member oscillate back and forth across the surface at a second rate to form a second pattern of markings on the surface at a second angle relative to the axis of rotation of the cylinder. The first and second angles differ by at least 15 degrees and one of the first and second angles ranges from about 60 to about 90 degrees and the other of the angles ranges from about 15 to about 75 degrees.

Another embodiment of the invention is a method of producing a tungsten carbide surface having a root-mean-square (RMS) surface roughness of about 25 nm (1 microinch) or less which includes contacting the tungsten carbide surface with an abrasive member having grit particles. The abrasive member is held between a support and the tungsten carbide surface. The support and the abrasive member oscillate back and forth across the tungsten carbide surface. These steps are repeated for each abrasive member in a series of abrasive members until the tungsten carbide surface has an RMS surface roughness of about 25 nm (1 microinch) or less. At least one of the abrasive members in the series has grit particles with an average diameter of 3 μm or less.

A further embodiment of the invention is a finished article which includes a substrate and a surface layer over the substrate. The surface layer is made with a tungsten carbide composition which contains about 12 to about 26 wt. % chromium. The surface layer has an RMS surface roughness of about 25 nm (1 microinch) or less.

Another embodiment is a cylindrical article which has a substrate and a surface layer on the substrate. The surface layer is formed from a tungsten carbide composition. The surface layer has an RMS surface roughness of about 25 nm (1 microinch) or less, as determined by light scattering, and a surface profile which varies by about ±0.013 mm (±0.0005 inches) or less.

The above summarizes various aspects of particular embodiments incorporating principles of the present invention. This summary discussion is not intended to summarize or describe every embodiment or every feature of the present invention.

DETAILED DESCRIPTION

Figure 1:
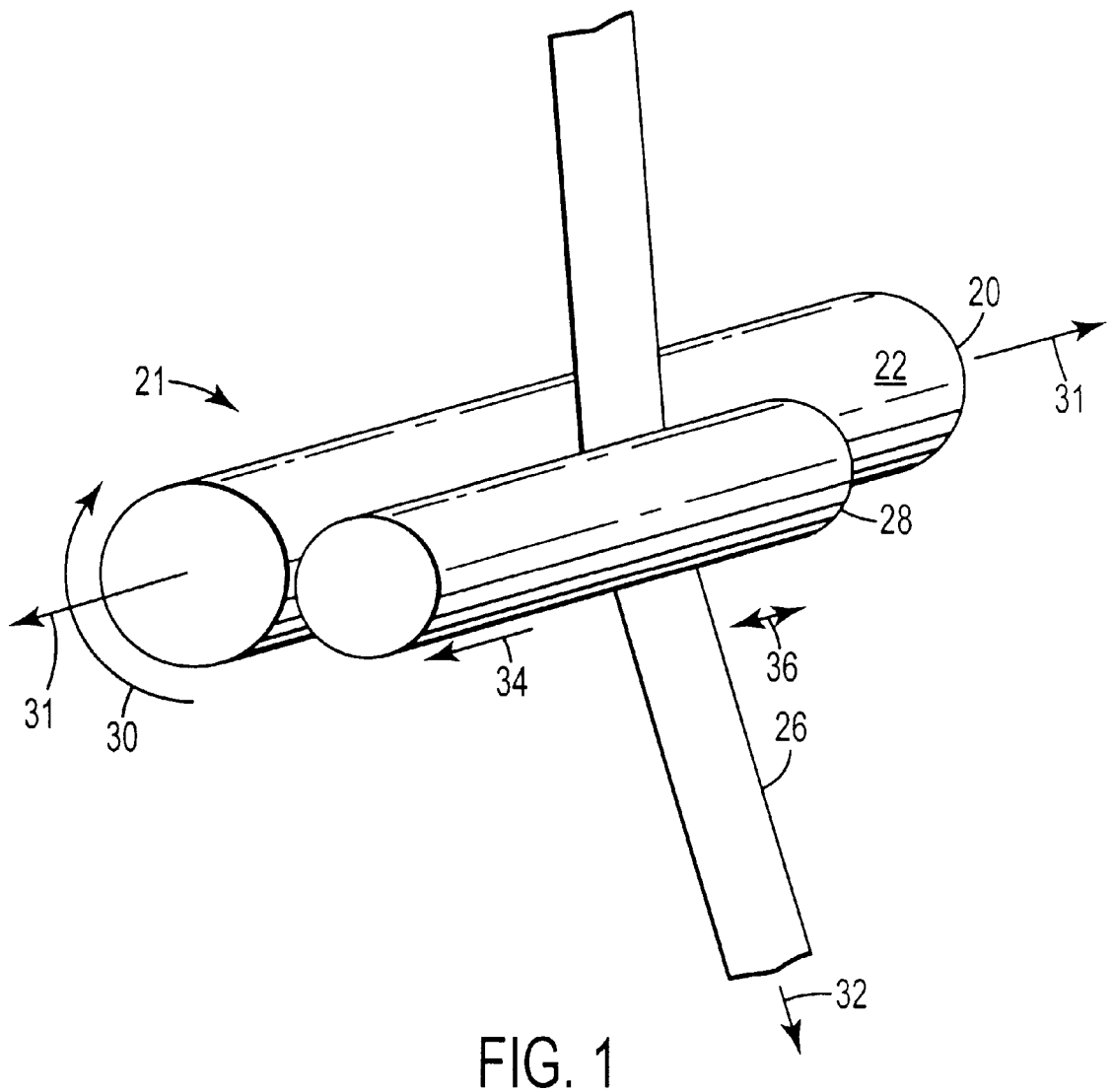
FIG. 1 is a perspective view of a tungsten carbide surface abrading apparatus using an abrasive film.

A smooth tungsten carbide surface can be formed by contacting the tungsten carbide surface with each abrasive member in a series of abrasive members. Each abrasive member includes grit particles provided on a surface of the abrasive member for contacting the tungsten carbide surface. Examples of abrasive members include abrasive films and slurries.

The abrasive member is positioned between a support and the tungsten carbide surface and pressure is applied by the support so that contact is made between the abrasive member and the tungsten carbide surface. The support and abrasive member oscillate back and forth across the tungsten carbide surface to finish the surface. This procedure is repeated for each abrasive member in the series. The grit particles of the abrasive members typically become finer as the series progresses.

In one embodiment, the tungsten carbide surface is formed on a cylinder. As the cylinder rotates, a support and a first abrasive member oscillate across the surface to form a pattern of scratches on the surface. The scratches of the pattern are typically tilted at a particular angle with respect to the axis of rotation. The angle of the scratches depends, at least in part, on the relative speeds of cylinder rotation and abrasive member oscillation. After abrading the surface with the first abrasive member, a second abrasive member is used. The rate of oscillation is altered so that the pattern of scratches is formed at an angle different from the first angle. This facilitates the removal of scratches caused by the first abrasive member, as the scratches on the tungsten carbide surface arising from contact with the first abrasive member stand out against the pattern of scratches arising from contact with the second abrasive member because the sets scratches are at different angles.

Using the methods of the invention, articles can be made with a tungsten carbide surface that has a root-mean-square (RMS) surface roughness, $R_q$, of about 25 nm (1.0 microinch) or less and, preferably, about 13 nm (0.5 microinches) or less. The RMS surface roughness, $R_q$, is a measure of the RMS depth of surface variations. In some embodiments, a tungsten carbide surface of a cylinder is finished to an RMS surface roughness of about 25 nm (1.0 microinch) or less and to a surface profile of about ±0.013 mm (±0.0005 inches) or less.

In general, the invention is believed to be useful in a variety of applications which benefit from smooth tungsten carbide surfaces. The invention has been found to be particularly useful and advantageous in connection with calender rolls and their manufacture, and it is in this context that the various aspects of the present invention are discussed. It will be appreciated that the techniques, devices, and articles described herein are also applicable to tungsten carbide surfaces on objects other than calender rolls or other cylindrical articles.

Typically, a tungsten carbide surface is formed by coating a substrate with a tungsten carbide composition. A wide variety of substrates may be used, including ceramics and metals. Suitable substrates include steel and other hard metals or alloys. In particular, hardened steel is a useful substrate material.

The tungsten carbide composition may contain a number of materials other than tungsten and carbon. In particular, the composition may contain other metals, such as chromium, nickel, titanium, or cobalt. In some cases, these metals form carbides or other inorganic compounds.

The composition may contain as much as 40% by weight of materials other than carbon or tungsten. One example of a suitable tungsten carbide composition includes about 55 to 80 wt. % tungsten, about 12 to 26 wt. % chromium, about 3 to 10 wt. % nickel, and about 3 to 9 wt. % carbon. Another tungsten carbide composition includes about 74 to 92.5 wt. % tungsten, about 7 to 20 wt. % cobalt, and about 0.5 to 6 wt. % carbon. One particularly useful tungsten carbide composition is SDG 2005, available from Praxair Surface Technologies, Inc. (Indianapolis, Ind.). "Tungsten carbide" for purposes of this invention includes WC, $W_2C$, $WC_x$ where x is between 0.5 and 1.0, as well as other combinations of tungsten and carbide, and mixtures of tungsten with the materials described above and their like.

The addition of metals, alloys or other materials to tungsten carbide to form the tungsten carbide composition may enhance properties of the tungsten carbide surface including improved adhesion of the composition to the substrate, durability, and hardness. For example, addition of 5–15 wt. % cobalt makes a strong durable substance often referred to as cemented tungsten carbide.

The tungsten carbide composition may be coated on the substrate by a variety of techniques, including spraying, chemical vapor deposition, physical vapor deposition, sputtering, or plasma deposition. One method for coating the substrate with a tungsten carbide composition uses a detonation gun (sometimes referred to as a "D-Gun"), as described, for example, in U.S. Pat. Nos. 4,826,734 and 5,075,129, incorporated herein by reference. The detonation gun has a fluid-cooled barrel with a small inner diameter. A fuel gas, for example, an oxygen-acetylene mixture, is ignited to produce a detonation wave which travels down the barrel of the gun. The tungsten carbide composition is heated and forcibly ejected from the gun onto the substrate. The tungsten carbide coating made by this process typically includes multiple overlapping layers of thin material.

Plasma coating is another method for depositing a tungsten carbide composition on a substrate. The tungsten carbide composition is heated to near or above its melting temperature. A plasma gas stream accelerates the tungsten carbide composition toward the substrate. On impact, the tungsten carbide composition forms a coating which also typically includes multiple overlapping layers of thin material.

Plasma coating and D-gun coating methods generally provide a relatively uniform tungsten carbide surface. There are typically very few topographical discontinuities, such as peaks or pits, which have a height or depth that is several times more than the RMS surface roughness, $R_q$. The absence of topographical discontinuities facilitates finishing the surface.

Other methods may form discontinuities in the surface. These discontinuities may not be removable by polishing or grinding processes. However, such discontinuities may not be important for tungsten carbide-covered articles used in applications that are relatively insensitive to imperfections. For example, calender rolls for use with paper products are typically not substantially affected by such imperfections. In contrast, calender rolls for the application of magnetic coatings to tape are sensitive to most surface imperfections. Because large topographical discontinuities are difficult to remove, an appropriate coating technique, which provides the desired level of uniformity, should be chosen.

Once the tungsten carbide composition is coated on the substrate, the tungsten carbide surface is rough ground. Typically, this rough grinding process provides the tungsten carbide surface with an RMS surface roughness of between about 1.25–6.5 μm (50–250 microinches). Standard rough grinding methods and devices may be used. For example, diamond wheels or a diamond paste may be used with a standard cylindrical grinder. If the RMS surface roughness of the tungsten carbide surface is about 1.25 μm (50 microinches) or less, then rough grinding may not be needed.

To determine the RMS surface roughness, $R_q$, light is scattered off the tungsten carbide surface and the ratio of scattered light to reflected light determines the RMS surface roughness. One particular instrument for performing this measurement is a scatterometer, such as the TMA μScan™ Scatterometer (Model H-670-01) from TMA Technologies, Inc. (Bozeman, Mont.). The scatterometer emits monochromatic light, typically from a laser, which is reflected off the surface. The reflected light is measured, as is the scattered light at two or more cattering angles. The RMS surface roughness, $R_q$, is then calculated as:

$$R_q = 4\pi\lambda \frac{P_s^2}{P_r^2}$$

where λ is the wavelength of light (670 nm for the TMA μScan™ Scatterometer), $P_s$ is the intensity of the scattered light, and $P_r$ is the intensity of the reflected light.

Other techniques and devices may be used to determine the RMS surface roughness. However, the values obtained may vary from those measured by the above-described method.

After rough grinding, the tungsten carbide surface is polished to an RMS surface roughness of about 13 to 50 nm (0.5 to 2 microinches). FIG. 1 shows one example of an apparatus 21 for polishing a tungsten carbide surface 22 coated on a cylindrical article 20. The cylindrical article is typically mounted on a lathe (not shown) which rotates the article 20 in a direction 30 about a rotational axis 31.

An abrasive member is brought into contact with the tungsten carbide surface 22 to finish the surface. The abrasive member illustrated in FIG. 1 is an abrasive film 26. The process will be exemplified using such films, although it will be recognized that other types of abrasive members, such as abrasive pastes or slurries, may also be used.

The abrasive film 26 typically contains many grit particles deposited on the surface of the film which faces the tungsten carbide surface 22. These grit particles are often diamonds or diamond fragments. The abrasive film 26 can be characterized by the size of the grit particles. Abrasive members, in general, and abrasive films, in particular, are categorized by a mesh size through which a given portion of the grit particles can pass (e.g., 100 grit) and/or by an average diameter of the grit particles (e.g., 3 μm). Typical grit particles for use in this invention has grit sizes of 1 to 100 μm or less.

Contact between the abrasive film 26 and the tungsten carbide surface 22 is maintained by application of pressure to the abrasive film 26 via a platen 28 which contacts the film 26. The pressure applied via the platen 28 may be varied depending on the desired amount of abrasion of the tungsten carbide surface 22. However, if the platen pressure is too high, then portions of the tungsten carbide surface 22 may be loosened which may increase the porosity of the surface 22. If the platen pressure is too low, then there will not be adequate polishing of the surface 22.

A variety of different platens 28 may be used, each platen having a characteristic surface hardness. The hardness of platen 28 impacts the amount of abrasion and the amount of contact between the tungsten carbide surface 22 and the abrasive film 26. For example, a softer platen deforms more than a harder platen under the same applied pressure. One reason for using a softer platen may be to provide a larger contact surface between the abrasive film 26 and the tungsten carbide surface 22.

The hardness of the platen 28 may be described, for example, in terms of a standard hardness measurement, such as the Rockwell hardness standard (ASTM E18-94, Standard Test Methods for Rockwell Hardness and Rockwell Superficial Hardness of Metallic Materials, ASTM Vol. 03.01) or in terms of a durometer standard (ASTM D 2240-95, Standard Method for Rubber Property-Durometer Hardness, ASTM Vol. 09.01). In the Example described below, a GEM microfinisher (Grinding Equipment & Machinery Co., Inc. Youngstown, Ohio) was used to polish a number of tungsten carbide cylinders. Included with the GEM microfinisher were the following platens (among others): a stainless steel platen having a Rockwell hardness of 45–50, a tan platen having a 70D durometer hardness, a black platen having a 70A durometer hardness, and an orange platen having a 30A durometer hardness. Typically, the stainless steel and black platens were used. However, other platens, including those listed above, may be used.

Pressure was applied by the platen 28 to the abrasive film 26 to produce contact between the abrasive film 26 and the tungsten carbide surface 22. Typical platen pressures for use with these platens and the GEM microfinisher, described above, ranged from about 35 to 265 kPa (about 5 to 30 psi), preferably from about 40 to 140 kPa (about 6 to 20 psi), and more preferably from about 45 to 100 kPa (about 7 to 15 psi).

The abrasive film 26 abrades the tungsten carbide surface 22 as the article 20 is rotated in a direction 30 about a rotational axis 31. As the article rotates, the entire surface of the article 20 is uniformly exposed to the abrasive film 26. The rotational speed of article 20 may vary depending, in part, on the nature of the article 20. Slow speeds are typically less efficient at finishing the surface, but high speeds may cause chipping or cracking. Typical speed are about 30–60 RPM (revolutions per minute) and preferably about 45–55 RPM.

Because the grit particles on the abrasive film 26 may wear down or be dislodged, the abrasive film 26 is often advanced in a direction 32 so that a new portion of the film is regularly presented to the tungsten carbide surface 22, to provide a relatively uniform amount of abrasion. If, however, the film advance speed is too slow, debris may accumulate between the abrasive film 26 and the tungsten carbide surface 22 and generate additional scratches in the surface 22. On the other hand, if the film advance speed is too fast, then the film is not being optimally used, which may increase the expense of the operation because of the suboptimal use of the diamond films. Examples of suitable film advance speeds range from about 0.6 to about 36 cm/min (about 0.25 to about 14 inches/min), preferably from about 2.5 to about 20 cm/min (about 1 to about 8 inches/min), and more preferably from about 5 to about 10 cm/min (about 2 to about 4 inches/min).

The platen pressure and the film advance speed are often interrelated. If the platen pressure is increased for a given platen, then the film advance speed may also be increased due to the increased wear on the grit particles at the higher pressure. For the GEM microfinisher, the ratio of film advance speed (in cm/min) to platen pressure (in kPa) typically ranges from about 1:2 to about 1:20, preferably, from about 1:3 to about 1:15; and more preferably from about 1:4 to about 1:10. This provides adequate polishing of the tungsten carbide surface 22.

Often the abrasive film 26 has a smaller width than the article 20. Commercially available films typically have widths of about 10 to about 20 cm (about 4 to about 8 inches). Because of its smaller width, the abrasive film 26 is swept across the tungsten carbide surface 22 of the article 20 in a direction 34 in order to polish the entire surface 22. One sweep across the surface 22 of the article 20 is often called a "pass". One or more passes may be made with each abrasive film 26. The number of passes depends, at least in part, on the desired amount of abrasion.

The speed at which the film 26 is swept across the surface 22 of the article 20 also determines, in part, the amount of abrasion. Typically, the sweep speed (i.e., the speed of the film 26 in the direction 34) is slow compared to the rotational speed of the article 20 in direction 30. Typically, the sweep speed is slow enough that the article 20 rotates more than 10–100 times in the period of time that it takes the film 26 to travel a distance equal to the film's width. Typical sweep speeds for the 10 to 20 cm (4 to 8 inch) abrasive films range from about 5 to about 25 cm/min (about 2 to about 10 inches/min) and preferably from about 8 to about 20 cm/min (about 3 to about 8 inches/min). The sweep speed may be adjusted so that about 150 to about 650 $cm^2$/min (about 25 to about 100 $in^2$/min) of the tungsten carbide surface is polished. Preferably, about 190 to about 500 $cm^2$/min (about 30 to about 75 $in^2$/min), and more preferably about 250 to about 400 $cm^2$/min (about 40 to about 60 $in^2$/min) of the tungsten carbide surface 22 is polished.

Typically, the tungsten carbide surface will be finished by abrading the surface with a series of abrasive films. Often the series of films will progress from coarser to finer grit particles. However, in some cases, a return to coarser particles will be necessary if deep scratches are found in the surface, or if there is a switch to a different type of grit particle (e.g., a switch from silicon carbide abrasive films to diamond abrasive films).

In at least some embodiments, a particular sequence of films is provided to accomplish a sequence of polishing steps. For example, a series of films may include one or more films having relatively large diamond grit particles to remove the pattern left by the rough grinding step. The grit size of the film or films chosen to remove the rough grinding scratches may depend on the RMS surface roughness after rough grinding. Films having grit particles with an average diameter of about 30 µm to about 75 µm are typically used for this operation.

Abrasive films with smaller diameter grit particles are then used to grind the article to a particular surface profile. The surface profile of a cylindrical article is determined by measuring the diameter of the article at various points along the axis of the article. The desired surface profile is obtained when the diameters of the article measured at each of the points is equal within a desired specification. In one embodiment, the desired surface profile varies by about ±0.013 mm (±0.0005 inches) or less and preferably about ±0.005 mm (±0.0002 inches) or less. A surface profile of noncylindrical articles can be determined similarly. Other measures of surface uniformity may also be used.

A relatively uniform surface profile can be obtained by polishing the surface with films having grit particles with average diameters that are typically between about 12 µm to about 45 µm. Often, polishing the surface to a relatively uniform surface profile incorporates the use of two or more films because finer grit films may not be aggressive enough to grind the surface to a desired profile and coarser grit films may leave large scratches.

Following the polishing of the article to a desired profile, the tungsten carbide surface is then abraded with one or more finer films to reduce the scratches on the surface from the preceding films. These finer films often have grit particles with a size of about 30µm or less. To achieve the desired surface profile and an RMS surface roughness of 25 nm (1 microinch) or less, at least one film in the series, preferably the last film in the series, has grit particles with an average diameter of about 2 µm or less, and more preferably, about 1 µm or less.

The progression from coarser to finer films within the series of abrasive films facilitates the removal of scratches. A finer abrasive film typically removes the deeper scratches made by a coarser abrasive film, leaving behind smaller scratches. The amount of abrasion which is needed to remove the deeper scratches depends, at least in part, on the pressure applied by the support and the relative grit particle sizes of the finer and coarser films. Two or more passes with a finer film may be needed to substantially remove the deeper scratches.

Typically, it is desirable to minimize the total number of passes because the porosity of the surface is often increased with each pass as more material is removed from the surface. An increase in porosity will typically decrease the durability of the tungsten carbide surface and may increase the RMS surface roughness of the film.

To minimize the number of passes needed for each abrasive film, the series of films may include films that are only slightly finer than the immediately preceding film. In general, however, if the average grit particle size of the film is too fine, then it may take more passes to remove the scratches; and if the average grit particle size of the film is too large, then there may be little difference between the scratches made by the current film and the one preceding. Thus, the grit particle sizes of the films are typically made progressively smaller in relatively small steps. In this manner, only a few passes, and in some cases only one pass, are needed to remove scratches caused by a preceding film. As an example, a series of six films has been used to successively remove scratches. The six films have grit particle sizes of 15 µm, 12 µm, 9 µm, 6 µm, 3 µm, and 1 µm, respectively.

An additional technique utilizing oscillatory motion of the abrasive films may be used to minimize the number of passes needed to polish the tungsten carbide surface. According to this technique, the abrasive film 26, in addition to traveling in a general direction 34, is provided with an oscillatory motion which is faster than the sweeping movement across the tungsten carbide surface 22. Typically this oscillatory motion is in a direction 36 approximately parallel to the rotational axis 31 of article 20, although oscillatory motion in other directions may also be used. This oscillatory motion enhances the abrasion of the tungsten carbide surface as the film is brought rapidly across the surface at an angle approximately perpendicular to the direction 30 of rotation.

The oscillatory motion improves the ability to determine when scratches from a coarser abrasive film have been removed by a finer film, thereby decreasing the number of passes needed to ensure the removal of the coarser-grit scratches. When the tungsten carbide surface 22 is abraded by the abrasive film 26, scratches on the surface 22 are often readily apparent, especially for films with coarser grit particles. However, it may be difficult to distinguish the scratches made by the coarser and finer films, although scratches from coarser films are typically deeper. Ideally, the scratches caused by one film are removed by the immediately subsequent abrasive films in the series. If a scratch is not removed by the immediately subsequent films, it can be difficult to remove later when even finer films are used to polish the tungsten carbide surface. Therefore, it may be necessary to return to earlier films in the series to remove the scratches. This may increase the surface porosity due to the increased number of passes needed to remove the scratches.

By varying the amount of oscillatory motion, the determination of scratch removal by the finer films can be enhanced. For example, if the article 20 is not oscillated, and if the sweep rate is long compared to the rotational rate of the article 20, scratches made by an abrasive film 26 are approximately perpendicular to the rotational axis 31. Scratches made be a film that is oscillated in a direction 36 will be at an angle with respect to the rotational axis 31. Typically, the faster the oscillation, the more acute the angle. Thus, if the oscillation speed is altered between two passes or two films, then scratches made at those two different oscillatory speeds will be at different angles and distinguishable if the difference in angles is sufficient. To be distinguishable, the scratches of one of the films preferably form a pattern at an angle of about 60 to about 90 degrees with respect to the rotational axis 31 of the article 20 and the scratches of the other film form a pattern at an angle of about 15 to about 75 degrees, and more preferably about 40 to about 60 degrees, from the rotational axis 31. These two angles should differ by at least about 15 degrees to be distinguishable.

Figure 3A:
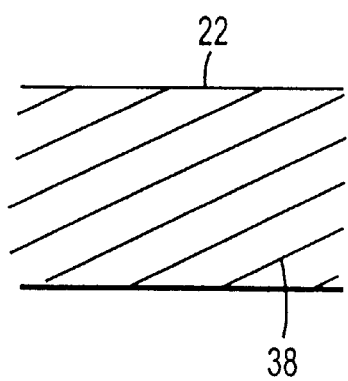
FIGS. 3A–3C are a sequence of top views of a tungsten carbide surface abraded using two abrasive films moving at different oscillatory speeds.
Figure 3B:
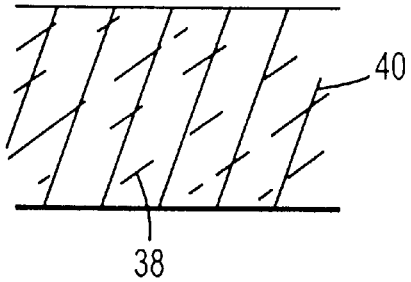
Figure 3C:
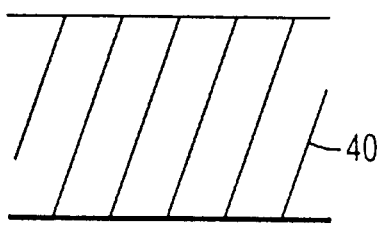

One example of this technique is illustrated in FIGS. 3A–C. In this example, a pass in a direction 34 (see FIG. 1) across the tungsten carbide surface 22 is made with a coarse film at a relatively high oscillation speed. This leaves a pattern of scratches 38 at a relatively acute angle with respect to the rotational axis 31, as illustrated in FIG. 3A. The tungsten carbide surface 22 is then abraded by a finer film at a relatively low oscillation speed, leaving scratches 40 at a more obtuse angle, as shown in FIG. 3B. After one pass with the finer film, the article may be inspected and if the scratches 38 from the coarse film are still visible, as depicted in FIG. 3B, then further passes with the finer film may be made until the scratches 38 from the coarser film are completely or nearly completely eliminated, as shown in FIG. 3C. In this manner, substantially all of the scratches from a film can be removed by immediately subsequent abrasive films without missing a scratch which may require returning to the earlier, more abrasive films in the series.

In one embodiment, the amplitude of the oscillatory motion is about 0.001 to about 0.005 percent of the width of the abrasive film, and preferably about 0.002 to about 0.004 percent of the width of the film. In addition, the abrasive film oscillates at a speed of between about 5 and about 40 strokes/sec and preferably about 10 to about 30 strokes/sec. The variation in oscillation may or may not be used for each pair of consecutive abrasive films in the series.

In addition to the techniques and methods described above, an optional method may be used to improve the uniformity of the finished film, and in particular to improve the surface profile of the film. Typically, as the abrasive film 26 is swept from one edge of the article 20 to the other, the film 26 is not allowed to extend beyond the edge of the article 20 as this may result in chipping of the edge of the article 20. However, if the abrasive film 26 is swept at a constant rate and removed from contact with the article 20 when it reaches the edge of the article, then portions of the article 20 near the edges will be abraded for a shorter period of time than the central portions of the article 20. This may result, for example, in a surface profile which is higher at the edges of the article 20 and lower near the center of the article. In many applications, especially calender rolls for use in the manufacture of magnetic tape, such surface profiles are unacceptable.

To obtain a more uniform surface profile, a dwell time at each edge of the article 20 may be initiated. This dwell time will vary depending on the sweep speed of the film 26, but should correspond to a period of time equal to about 5–10% of the time it takes the film to move a distance equal to its width. The dwell time can also be determined by measuring the surface profile after each pass and adjusting the dwell time accordingly. This dwell time need not be initiated for each pass made by the abrasive film 26, but is especially useful for passes made with abrasive films having coarser grit particles which tend to remove a relatively large amount of material.

The polishing of the tungsten carbide surface 22 has been exemplified by methods using an abrasive film 26. However, devices other than those incorporating abrasive films may be used to polish the tungsten carbide surface. For example, grit particles may be bonded on a polishing implement, such as a roll, which then abrades the tungsten carbide surface. Alternatively, the abrasive grit particles may be a component in a paste or slurry that is spread upon a pad or other surface, such as that shown in FIG. 2. This apparatus is described in detail below with respect to superfinishing the surface, but if appropriately sized grit particles are used, then the apparatus can be used to polish the tungsten carbide surface. Other devices and modifications of the described devices will be useful in polishing the tungsten carbide surface 22 of an article 20.

Typically, the polishing of the tungsten carbide surface produces a smooth surface which may have an RMS surface roughness of about 25 nm (1 microinch) or less, along with the desired surface profile. However, visible scratches may remain on the tungsten carbide surface. It has been found that these scratches may be difficult to remove even when finer grit films are used. For many applications these scratches will be acceptable. However, for calender rolls used in the manufacture of magnetic tapes and other similarly sensitive applications, it is necessary to have a surface without visible scratches.

If the scratches are visible, either to the naked eye or at 100× magnification, further superfinishing of the tungsten carbide surface may be necessary. Superfinishing refers to the finishing of a surface to provide an RMS surface roughness, $R_q$, which is about 13 nm (about 0.5 microinches) or less and does not have scratches visible at 100× magnification.

Figure 2:
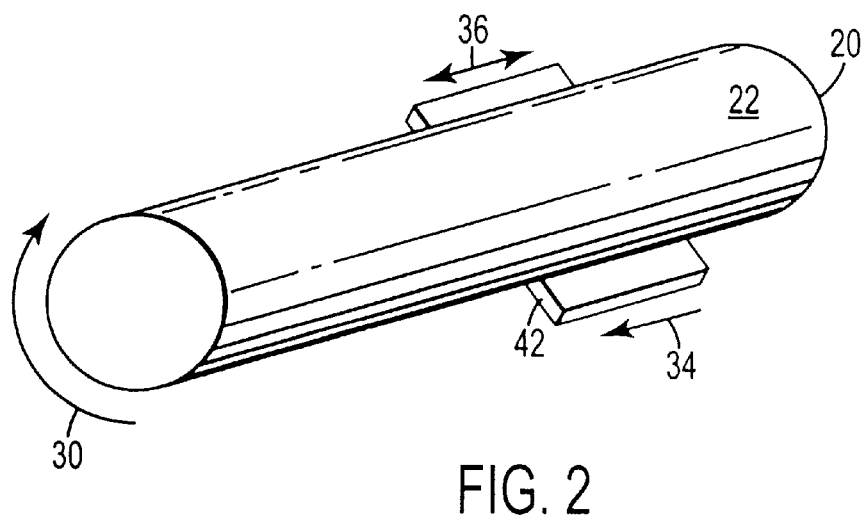
FIG. 2 is a perspective view of a tungsten carbide surface abrading apparatus using an abrasive-coated pad.

One method of superfinishing a tungsten carbide surface, which has been polished as described above, includes contacting the tungsten carbide surface with a grit particle-containing paste or slurry that has been applied to a pad 42, as illustrated in FIG. 2. Pressure is applied by the pad 42 to abrade the tungsten carbide surface 22. The amount of pressure applied to the pad is similar to the amount applied to the platen that is used with the abrasive films.

The pad 42 is swept in a direction 34 across article 20 as the article 20 rotates in a direction 30 about the rotational axis 31. Oscillatory motion 36 may optionally be used to enhance the abrasion of the surface. More than one paste or slurry and more than one pass for each paste or slurry may be used. Rotation rates, sweep times, and oscillatory motion rates are similar to those described above in connection with the apparatus illustrated in FIG. 1.

The pad 42 is typically made from felt, wool, or similar fabrics. The paste or slurry typically includes diamond grit particles having a particular average diameter. For the purposes of superfinishing, the average grit particle diameter is about 1 μm or less, and preferably about 0.25 μm to about 1 μm. One example of a suitable material is the Hyprez L Diamond Lapping Compound from Engis (Wheeling, Ill.).

The paste or slurry may also include one or more lubricating materials such as water, polyalkylene glycols, isoparaffinic hydrocarbons, or the like. One example of a suitable lubricant is Hyprez OS Lubricant Type IV from Engis (Wheeling, Ill.).

Although the formation of a relatively smooth tungsten carbide surface has been exemplified with respect to a cylindrical article, the invention is not limited to cylindrical articles. Many of the techniques, devices, and materials described herein can be applied to surfaces on articles having other shapes.

For example, articles having a planer surface can be finished by abrasion with an abrasive member that is swept across the planer surface. Oscillatory motion may also be combined with this sweeping motion in a direction that is, for example, perpendicular to the sweeping motion. This will generate a pattern of scratches at an angle determined by the relative rates of the sweeping and oscillatory motions. In some cases, the article may be moved instead of or in conjunction with the abrasive member.

Furthermore, the methods and techniques described above can also be used to refinish tungsten carbide surfaces. Such refinishing will often be necessary because, as an article with a finished or superfinished tungsten carbide surface is used, for example, as a calender roll, scratches will be formed in the tungsten carbide surface. When the smoothness of the tungsten carbide surface no longer meets the specifications of the application, then the article is typically replaced or refinished.

The refinishing process may begin at any point in the procedure described above. For example, the tungsten carbide surface may need to only be superfinished with the 1 $\mu$m or less slurry or paste. Alternatively, the surface may need to be polished starting with, for example, a 9 $\mu$m abrasive film. In some cases, the entire process may need to be performed, beginning with the formation of a new or additional tungsten carbide coating on the substrate.

The following example provides an illustration of one or more embodiments of the invention. By no means are these examples designed to be all-inclusive or to limit the invention. All measurements and values in the preceding description and in the following Example are approximate. Actual values of apparatus parameters may vary depending, at least in part, on the particular apparatus used and the particular article being finished.

EXAMPLE

Several small cylinders of hardened steel having a diameter of about 28 cm (11 inches) and a length of about 25 cm (10 inches) were coated with about 125–175 nm (about 5–7 mils) of a tungsten carbide composition (SDG 2005, Praxair, Indianapolis, Ind.) using a detonation gun coating technique. The cylinders were rough ground to a surface roughness of approximately 1.5 $\mu$m using a standard cylindrical grinder, such as those made by TOS/Hostivar (Czech Republic). The surface roughness was determined using a TMA $\mu$Scan™ Scatterometer (Model H-670-01) from TMA Technologies, Inc. (Bozeman, Mont.).

Each of the cylinders, in turn, was placed on a lathe, similar to the lathes manufactured by LeBlonde Mankino (Mason, Ohio), and the tungsten carbide surface of the cylinder was polished using a GEM microfinisher (Grinding Equipment & Machinery Co., Inc., Youngstown, Ohio). A series of diamond films, Imperial Diamond Lapping Films from 3M Company (St. Paul, Minn.), were used to polish the surface. The grit particle diameter, number of passes, oscillation speed, platen, pressure applied to the diamond film via the platen, and oscillation speed for each film is provided in Table 1.

TABLE 1

Polishing Parameters

| Step | Grit Size, $\mu$m | Number of Passes | Platen | Platen Pressure, kPa (psi) | Oscillation Speed, strokes/sec |
|---|---|---|---|---|---|
| 1 | 45 | 3 | Stainless Steel | 70 (10) | 8 |
| 2 | 30 | 3 | Black | 70 (10) | 2 |
| 3 | 15 | 2 | Black | 70 (10) | 8 |
| 4 | 9 | 2 | Black | 70 (10) | 2 |
| 5 | 6 | 2 | Black | 70 (10) | 8 |
| 6 | 3 | 2 | Black | 70 (10) | 2 |
| 7 | 1 | 2 | Black | 70 (10) | 2 |

Each film was about 10 cm (4 inches) wide and was advanced at a rate of about 5 cm/min (about 2 in/min) to continuously present a new abrading surface to the tungsten carbide. Each cylinder was rotated at about 45 RPM (revolutions per minute) and the sweep rate of the abrasive film across the tungsten carbide surface of the cylinder was about 13 cm/min (about 5 in/min). During the polishing process, water was continuously flowing across the region where the cylinder and abrasive films met to wash away debris.

After polishing, the surface profile of each cylinder was about ±0.0025 mm (about ±0.0001 inches) and the measured RMS surface roughness was about 13 nm (about 0.5 microinches). However, scratches could still be seen.

The cylinders were then superfinished. An abrasive slurry, Hyprez ¼ L Diamond Lapping Compound (Engis, Wheeling, Ill.), having 0.25 $\mu$m diamond particles in a paraffin oil/polyalkylene glycol lubricant, Hyprez OS Lubricant Type IV (Engis, Wheeling, Ill.), was applied to a hard felt pad, approximately 10 cm×15 cm×0.3 cm (4 in×6 in.×⅛ in.), made from virgin wool. The pad was advanced at a rate of about 13 cm/min (about 5 in/min) across the surface of the cylinder. The cylinder was rotated at about 45 RPM. A pressure of about 200 kPa (about 30 psi) was applied to the slurry via the pad to abrade the surface of the cylinder. Four to six passes were made with the pad.

The resulting superfinished tungsten carbide-coated cylinders had an RMS surface roughness of about 7.5–9.0 nm and a surface profile of about ±0.0025 mm (about ±0.0001 inches). There were no scratches visible to the naked eye or to 100× magnification under a microscope.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A finished article comprising:

a substrate; and a surface layer over the substrate, wherein the surface layer has an RMS surface roughness of about 25 nm or less and wherein the surface layer comprises a tungsten carbide composition which contains about 12 to about 26 wt. % chromium.

2. The finished article of claim 1, wherein the tungsten carbide surface is cylindrical.

3. The finished article of claim 1, wherein the article has a surface profile of about ±0.013 mm or less.

4. The finished article of claim 1, wherein the RMS surface roughness is about 13 nm or less.

5. A cylindrical article, comprising:
a cylindrical substrate; and
a surface layer on the cylindrical substrate, the surface layer having an RMS surface roughness of about 25 nm or less as determined by light scattering and a surface profile which varies by about ±0.013 mm or less, wherein the surface layer comprises a tungsten carbide composition.

6. The article of claim 5, wherein the tungsten carbide composition comprises about 12 to about 26 wt. % chromium, about 55 to about 80 wt. % tungsten, and about 3 to about 9 wt. % carbon.

7. The article of claim 6, wherein the tungsten carbide composition further comprises about 3 to about 10 wt. % nickel.

8. The article of claim 5, wherein the RMS surface roughness is about 13 nm or less.

9. The article of claim 5, wherein the article is a calender roll.

10. The article of claim 5, wherein the surface layer is scratch-free as viewed under 100× magnification.

* * * * *